A. WEDDERBURN.
APPARATUS FOR DEFECATION.
APPLICATION FILED APR. 24, 1909.
1,052,195.
Patented Feb. 4, 1913.
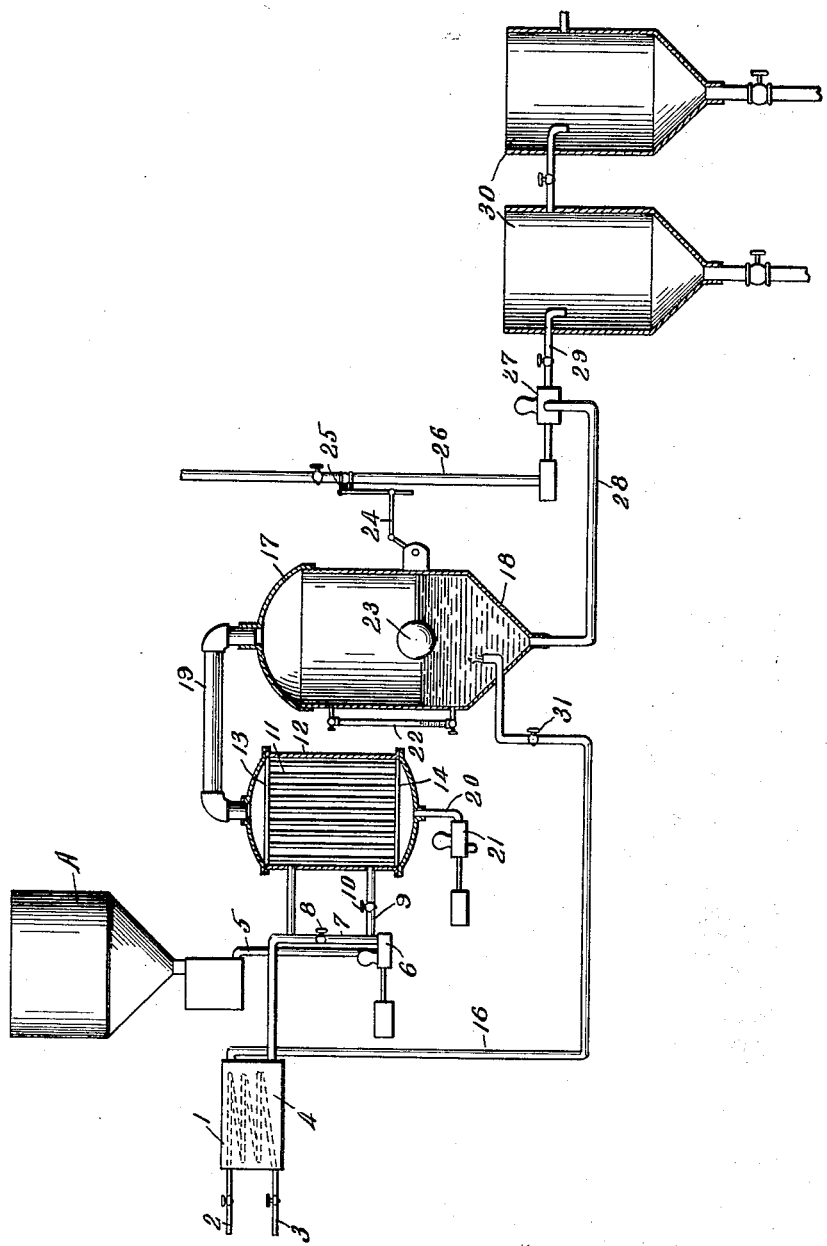
Witnesses
H. A. Robinette
S. V. Caffrey
Inventor
Augustus Wedderburn.
By K. P. McElroy.
Attorney
COLUMBIA PLANOGRAPH CO., WASHINGTON, D. C.

UNITED STATES PATENT OFFICE.

AUGUSTUS WEDDERBURN, OF VIENNA, VIRGINIA, ASSIGNOR TO DEMING APPARATUS COMPANY, OF NEW YORK, N. Y., A CORPORATION OF NEW YORK.

APPARATUS FOR DEFECATION.

1,052,195.     Specification of Letters Patent.     Patented Feb. 4, 1913.

Application filed April 24, 1909. Serial No. 492,009.

*To all whom it may concern:*

Be it known that I, AUGUSTUS WEDDERBURN, a citizen of the United States, residing at Vienna, in the county of Fairfax and State of Virginia, have invented certain new and useful Improvements in Apparatus for Defecation, of which the following is a specification.

This invention relates to apparatus for defecation; and it comprises a method of defecating sugar juices by heating the same under pressure after proper alkalization, releasing the pressure in such a manner as to cause the evolution of contained gases and thereafter separately collecting the clarified liquid and settled solids, such release of pressure being preferably done under more or less vacuum and the heat of the evolved vapors and gases being collected and utilized; and it also comprises an apparatus for defecating sugar liquids comprising means for heating such juices under pressure to produce defecatory actions, means for releasing the pressure in such manner as to cause contained gases to be evolved, means for separately withdrawing clarified liquids and separated solids, and means for restoring the heat of the said gases and coevolved vapor to fresh liquid; all as more fully hereinafter set forth and as claimed.

The ordinary methods of defecating cane juice, sorghum juice, etc., involve liming the juice to or beyond neutrality and heating. More rarely, the juice is heated without the addition of defecating chemicals. In either event, at the boiling temperature a large portion of the contained albuminoids flocculates or coagulates, giving a separation of solids. Insoluble solids in the juice are entangled by and collected with this separated matter. Where, as is usually the case, the juice is also limed, a further amount of separation in the form of lime salts also takes place. In ordinary open tank defecation, entangled air, steam, etc., usually keep this separated matter floating as a "blanket" of scum though there is usually also a deposit at the bottom of the tank.

In the described operation, the separation of impurities is rarely so complete as is desired and it has long been proposed to facilitate such separation by raising the temperature of defecating by heating the sugar juice under pressure. This gives a better separation and the solids separated are in better physical shape for filter-pressing and the like. But it is found that it is often difficult to make a sharp separation in this way, the liquid being more or less turbid and frequently very much so while it is difficult to collect the solids without also withdrawing an excessive amount of liquid. Turbid liquids going forward into the sugar house are undesirable for a number of reasons and it is of course largely the object of the defecating operation to produce clear liquids suitable for further operations in the sugar house. The separated solids do not settle as well as their specific gravity would indicate and are generally recovered distributed through a considerable bulk of liquid. This liquid must of course be recovered, and if this be done by filter pressing, as is usually the case, a pressure plant of undue size is required.

Much of the difficulty I have found to be due to the temporary variations in pressure during the operation. In the original juice there is considerable dissolved air and gases and much entrained air is also always present. In heating the liquid under pressure, the excess of gases go into solution in a degree proportional to the pressure prevailing. Since this pressure is fluctuating from moment to moment under the periodical action of the pump feeding the superheater, under variations in heat supplied, etc., the solubility of the gases fluctuates simultaneously. In a temporary phase of relatively low pressure, dissolved gases are released in the form of excessively minute bubbles adhering to the solid bodies which act as nuclei, and these released bubbles are not always taken up in the next temporary phase of relatively high pressure. These minute bubbles adhering to the solid matters buoy them up and lower their specific gravity, rendering settling difficult. These fluctuations of pressure in the heating as a matter of fact keep the liquid stirred up. There is also an objectionable classification of impurities, the fine fibers always present in cane juice tending to rise and form a "blanket" while slimier precipitated solids have more tendency to sink. The fibrous matter in subsequent operations should remain well mixed with the other impurities as it aids materially in filtering.

In practice, the solids coming from the superheater are found to be permeated intimately with fine bubbles of gas and vapor; and if special precautions be not taken, the apparent specific gravity of the solids as a whole remains much less than it should be. On standing, the gas is slowly released, keeping the liquid more or less agitated and turbid. This is the reason for the lack of sharp separation in the described practice. It has been proposed to discharge the liquid from the superheater into tanks under pressure for settling, but this has not worked well in practice, it being as difficult to prevent variations in pressure in the tanks as in the superheater while removal of adhering gas is not provided for. Usually, the liquid is passed in a slow current through a tortuous circuit in the pressure tank, dependence for settling being placed on the slowness of the current. But, as stated, a good separation is not attained. By the present invention the gases and vapors however may be positively removed from the defecated liquid and a good separation of solids thereafter attained. Preferably this is done by simply reducing the pressure and permitting ebullition prior to settling. Removal by violent agitation is not so suitable since the solids are apt to be "slimed," in a way which interferes with good settling later. In the present invention therefore, I preferably remove gases and vapors by a reduction of pressure prior to settling, discharging the superheated liquid from the digester into a chamber wherein prevails a greater or less vacuum. Under the influence of this vacuum, the air and gases present leave the liquid and the solids are freed of adhering bubbles. In this sudden lowering of pressure much of the water of the superheated liquid also flashes into vapor, forming steam and cooling the liquid and the disengagement of steam aids positively in disengaging the gases. After exposure to the reduction in pressure with concomitant release of gases, on again raising the pressure, as by taking from vacuum to ordinary pressure, the liquid and the solids will separate sharply giving a bright, clear liquid with settled solids separating as a dense body or magma containing comparatively little liquor. The liquid may of course be re-heated to compensate for the drop in temperature. A magma of this character is easily and economically handled in a filter press.

For the sake of economy the hot gases and vapors coming from the liquid in the reduction of pressure may be used to heat cold liquids, the vapors being condensed thereby and the production of vacuum facilitated. For instance, the superheated air-charged liquid may be discharged into a chamber provided with means for producing vacuum therein and the vapors and gases withdrawn passed through a heat interchanger to condense the vapors and to give up heat to a cold liquid. This condensation of the vapors aids in producing exhaustion in the vacuum chamber. The cold liquid heated by the vapors may very advantageously be the liquid going to the superheater. Instead of a heat interchanger, a spray or jet condenser may be employed. The heat interchanger is, however, convenient and useful. In a typical installation, for instance, the hot juice may be sent into a vacuum chamber, and the vapors and gases withdrawn from said chamber by a "wet" vacuum pump. Between the pump and the vacuum chamber a simple form of heat interchanger may be located. Such heat interchanger may consist of a nest of tubes through which the vapors pass while raw juice to be heated passes around the outer side of the tubes, or the vapors may pass around the tubes and the liquid to be heated within the tubes if desired.

In the accompanying illustration, I have shown more or less diagrammatically, certain embodiments of apparatus elements within the limits of the described invention. In this showing the figure is a view partly in vertical section and partly in elevation of a typical apparatus.

In the illustration, superheater 1 is shown as a simple tank provided with steam inlet and outlet 2 and 3, and coil heater 4. Juice, which may be either limed or unlimed, but is preferably limed, coming from a suitable source such as A through pipe 5 is delivered under pressure by pump 6 into conduit 7 valved at 8. This conduit delivers the juice under pressure into the superheater. A by-pass pipe 9 valved at 10 leads a determined portion of the juice around the heating tubes 11 of a heat exchanger 12. As shown, this heat exchanger is provided with headers 13 and 14 in which the tubes are set. Pipe 15 returns juice from the heat exchanger to the conduit leading to the superheater. Superheated juice is supplied by conduit 16 into releasing chamber 17. As shown, this releasing chamber is a closed tank with a coned bottom 18. At its top it is connected to vapor line 19, leading vapors to the heat interchanger and through the tubes thereof. The vapors condensed in the heat interchanger are removed from its coned bottom through outlet 20 by pump 21, which may be any of the ordinary types of "wet" air pump. The releasing chamber is provided with gage glass 22 and float 23. The float operates through suitable stuffing boxes and lever mechanism (not shown), levers 24 controlling a valve 25 in steam pipe 26. This steam pipe feeds pump 27, which withdraws liquid from the releasing chamber through conduit 28, and delivers it through pipe 29 to a series of settling tanks 30.

As stated, the liquid cooled in the vacuum chamber may be re-heated if desired, by any suitable means.

From the foregoing the operation of this structure is easily to be seen.

Raw juice which may have previously been treated with lime or with lime and other depurating chemicals, such as carbon dioxid, sulfurous acid, phosphoric acid, alum, sulfate of alumina, etc., is sent by pump 6 into the superheater 1. In the case of cane and sorghum juice this preliminary treatment may be, and usually is, a simple liming to neutrality, or on either side of neutrality as the operator may prefer. In the superheater the juice is exposed to high temperature and pressure. This temperature may be at any point above the boiling point of water which may be desired. A temperature of 220° to 290° F. is suitable for most uses. In this superheater no evolution of vapor is permitted. Under the high temperature and pressure prevailing various reactions go on in the juice which result in the separation of impurities. Entrained air and gases in the liquid also dissolve to a large extent, but, as stated, every variation in the pressure in the superheater results in some change in the proportion of dissolved to the entrained gases. A temporary increase in pressure results in the solution of more gas and the reduction in pressure in the liberation of some. Because of the well known "nucleus action" the separation of gases by a temporary reduction of pressure is apt to take place tolerably uniformly throughout the mass of the suspended solids. The liquid leaving the superheater is therefore a mixture of liquid and air-buoyed suspended solids. The superheated juice leaving the superheater goes through pipe 16 into the releasing chamber. Under the influence of the vacuum therein prevailing the minute gas bubbles rise and are extracted, leaving the solids with their natural specific gravity and inclined to settle. The release of pressure also causes steam to be evolved, which materially aids in the separation of the gases. Under the stated nucleus action the evolution of vapor is apt to take place in contact with the solids in the same way as the stated evolution of gas bubbles. The vacuum in this chamber may be of any degree desired, but it is desirable that there should always be a pressure less than atmospheric. This is for the reason that in subsequently treating the juice under atmospheric pressure to settle the solids there can then be no more evolution of gas or vapor. In passing from the exhausting chamber whatever the degree of vacuum therein, to atmospheric pressure there will be a rise in pressure so there will be no tendency for separation of gas in the settlers. The evolution of vapor takes place to an extent corresponding to the temperature of the liquid in the vacuum chamber. The mixture of vapor and gas passing off through 19 is cooled in the heat interchanger and the steam converted into water. The condensation materially aids in the operation of the vacuum pump 21. The heat given up by the vapors and gases is transferred to the portion of juice by-passed through 9 and 15 and is utilized.

The mixture of gas and vapor passing through 19 may of course be led into any other form of condenser, such as a jet condenser or a barometric column, or it may be sent directly into the juice which is to be superheated and there condensed; but there is ordinarily no advantage in any of these procedures over that of condensing in the described heat-interchanger. The heat interchanger may of course be located at any point between the body of liquid in the releasing chamber and the vacuum producing means where it will cool the evolved gas and vapor coming from the body of liquid in such releasing chamber.

The flow of defecated liquid into the releasing chamber may be controlled by valve 31, which may be any form of reducing valve. The liquid may enter at any point in the chamber, but it is convenient to discharge it therein as shown, at a point about midway the height of the body of liquid therein. This allows the bubbles to rise therein without disturbing the body of liquid below the point of introduction and as the solids rise also to the surface, lose their gas and sink, they fall into this undisturbed body. The releasing chamber may advantageously be rather large, thereby affording a sort of "dominant pool," averaging out inequalities in the composition of the juice flowing in and also insuring that the body of liquid as a whole shall be fairly quiet.

From the foregoing it will be obvious that in the present method, the gases and the solids are separately removed from the defecated liquid whereas in the methods of the prior art, the gas left the liquid in the same vessel in which the separation of solids was effected. The advantage of this difference is great.

The body of liquid in the releasing chamber is maintained at a constant level by the float valve 23 which governs the operation of the pump 27 by controlling the steam feed thereof.

The mixture of degasified solids and liquid withdrawn by pump 27 is sent through 29 into settling tanks 30, which are of an ordinary type. In these tanks the solids, which *per se* are free from gas are considerably heavier than the liquid, settle quietly and easily to form a fairly concentrated magma which may be withdrawn from the coned bottoms of the tanks and sent to any desired type of filter. The clarified liquid drawn off from the settling tanks is bright and clear and ready for evaporation. The settling tanks being under atmospheric pressure, no evolution of gas or vapor as bubbles can take place in a liquid which has been under vacuo at the same temperature.

While unlimed cane, sorghum and beet juice can be treated in the superheater with advantageous results, it is usually preferable to supply the said superheater with juice which has been treated with the ordinary defecating chemicals.

By the present method, the discharge from the superheater, containing gassy solids which would tend to form a blanket, is exposed to a vacuum long enough to remove the gas and is then allowed to settle at the ordinary pressure; or, in other words, there is an intermediate drop in pressure between the defecating and the settling steps. It will be obvious that the same result could be attained by releasing the defecated juice in a receiver at atmospheric pressure and then settling under higher pressure. But there is no special advantage in this modification; it is usually more convenient to operate in the described manner, using more or less vacuum in the intermediate releasing stage.

One of the advantages of the described process is that the solids are recovered from the settling tanks in excellent condition for filter pressing or bag pressing. In cane and sorghum juice there is usually considerable fibrous matter which in the usual procedure tends to float more obstinately than the more slimy solids formed in the defecation, forming a blanket which it is difficult to beat down. And as these other solids tend more to sink, the settlings ultimately recovered are uneven in composition so that they do not filter or strain well, gumming up the filter cloth. Using the described degasification, the cane fiber and mechanical impurities are well distributed throughout the body of the sediments, so that such sediments press or filter well. In treating the juices under the present invention, about half the filter-press capacity is required as compared with that necessary under the usual practice.

The superheater employed may be discontinuous in operation, treating successive bodies of juice, or it may be, as shown, continuous. Return-flow types may be employed to economize heat, but are hardly necessary since economy is given by the type shown, part of the heat being restored to the juice and part being used to produce evaporation in the releasing chamber. Such releasing chamber may in fact be considered, in the type shown, as performing the functions of an evaporator. This function may be developed, if desired, by providing the releasing chamber with heating means such as a steam jacket or steam coils; or it may be made one of the effects of a multiple effect apparatus. But this is hardly desirable since the separated solids tend to collect on heating elements and it is therefore preferable to postpone positive evaporation as distinguished from heating until after settling and separating the solids from the clear liquid. With a simple releasing tank of the type shown there is little chance of clogging and it can easily be blown clear from time to time. No removal of the solids from the liquid should be attempted therein, it being best to reserve this for the settling tanks proper. While the first portions of defecated juice run in may form a blanket, this is not of lasting character and the effluent from the releasing tank is soon of the same average composition, as regards solids and liquid, as the material fed thereto. In the settling tanks, the effluent displays no tendency to form a blanket, the buoying air and gases having been removed in the releasing chamber.

While other methods of defecating may be employed upon the juice going to the superheater, simple liming is sufficient. The process also works advantageously upon unlimed juice; but in general it is better to lime when using cane and sorghum juice. The temperature in the superheater may advantageously be around 230° to 235° F., but small variations in temperature and pressure are not injurious in the present method. In the releasing chamber, a vacuum of 5 or 10 inches is sufficient though higher vacua may be carried. Under this vacuum, a rapid cooling to the corresponding temperature is effected, a cooling which may be later obviated by re-heating prior to settling. The liquid in any event must be re-heated for subsequent evaporation.

What I claim is:—

1. A defecating apparatus comprising a juice heater, a juice preheater, a vacuum chamber and a settling chamber all pipe connected, means to supply juice thereto, and a valved bypass between the heater and preheater, whereby a predetermined quantity of the juice may be passed through the preheater before entering the juice heater, and means to heat the preheater by vapors from the vacuum chamber.

2. In apparatus for treating liquids carrying solids in suspension, a gas-eliminator comprising a closed tank having a liquid-inlet and outlet and an outlet for fixed gases, means for maintaining a constant liquid level within said tank, and a surface condenser located outside of and in operative connection with said tank.

In testimony whereof, I affix my signature in the presence of witnesses.

AUG. WEDDERBURN.

Witnesses:
WM. C. PATON,
L. H. MEEKER.